United States Patent [19]
Anderson et al.

[11] Patent Number: 5,481,199
[45] Date of Patent: Jan. 2, 1996

[54] SYSTEM FOR IMPROVING MEASUREMENT ACCURACY OF TRANSDUCER BY MEASURING TRANSDUCER TEMPERATURE AND RESISTANCE CHANGE USING THERMOELECTRIC VOLTAGES

[76] Inventors: Karl F. Anderson, 43634 N. Gadsden; Allen R. Parker, 815 W. Ave. L, both of Lancaster, Calif. 93534

[21] Appl. No.: 125,888

[22] Filed: Sep. 24, 1993

[51] Int. Cl.$^6$ .............................. G01R 27/02; G01R 1/22
[52] U.S. Cl. .......................... 324/705; 324/706; 324/713; 324/601; 324/130; 73/862.628
[58] Field of Search .................................... 324/601, 705, 324/713, 130; 73/720, 726, 862.627, 862.628, 862.68, 862.045; 338/2–3; 374/183

[56] References Cited

U.S. PATENT DOCUMENTS 3,665,756  5/1972  Russell .
4,309,653  1/1982  Stack et al. .
4,448,078  5/1984  Bridges .

FOREIGN PATENT DOCUMENTS 2-218903  8/1990  Japan .

OTHER PUBLICATIONS

NASA Technical Memorandum 104260, "The Constant Current Loop: A New Paradigm for Resistance Signal Conditioning", by Karl F. Anderson, Oct. 1992.

Primary Examiner—Kenneth A. Wieder
Assistant Examiner—Barry C. Bowser

[57] ABSTRACT

A constant current loop measuring system measures a property including the temperature of a sensor responsive to an external condition being measured. The measuring system includes thermocouple conductors connected to the sensor, sensing first and second induced voltages responsive to the external condition. In addition, the measuring system includes a current generator and reversor generating a constant current, and supplying the constant current to the thermocouple conductors in forward and reverse directions generating first and second measured voltages, and a determining unit receiving the first and second measured voltages from the current generator and reversor, and determining the temperature of the sensor responsive to the first and second measured voltages.

30 Claims, 4 Drawing Sheets

SYSTEM FOR IMPROVING MEASUREMENT ACCURACY OF TRANSDUCER BY MEASURING TRANSDUCER TEMPERATURE AND RESISTANCE CHANGE USING THERMOELECTRIC VOLTAGES

BACKGROUND OF THE INVENTION

1. Field of the Invention

The present invention generally relates to a system for improving the measurement accuracy of a variable resistance transducer such as a strain gauge. The system generates two voltages. The first voltage is a function of the resistance change measured by the transducer, and the second voltage is representative of the ambient temperature of the transducer. These generated voltages are achieved with very few lead wires and without the need for a second transducer. In addition, the measurements are uncontaminated by lead wire resistance effects.

2. Description of the Related Art

Several approaches are currently available for measuring resistance and temperature parameters in variable resistance transducers. These approaches are generally based on using separate transducers and wiring from the measurement system to the article to be measured. For example, the classic Wheatstone bridge electrical circuit is typically used for measuring small variations in resistance, for example, to measure resistance changes when a strain gage is used as a transducer. The Wheatstone bridge may also include a second resistor to compensate for the temperature effects experienced by the main transducer resistance. An additional method of removing measurement error encountered when using the Wheatstone bridge includes measuring the transducer temperature using a separate thermocouple or resistance temperature device (RTD).

In addition, constant current excitation has been used in an attempt to achieve a linear output and avoid parasitic resistance problems when measuring resistance and temperature using, for example, a transducer. Constant current excitation can also achieve double the output voltage for a given power dissipation in the resistance transducer when compared to voltage divider circuits such as the Wheatstone bridge. "Constant Current Loop Signal Conditioning", the subject of a pending patent application, Ser. No. 08/018,128, filed Feb. 16, 1993, is an innovative form of constant current signal conditioning that uses a form of output voltage processing to completely eliminate lead wire resistance effect. Constant current loop signal conditioning is also discussed in NASA Technical Memorandum 104260 by Karl F. Anderson, "The Constant Current Loop: A New Paradigm for Resistance Signal Conditioning." Both the Patent application Ser. No. 08/018,128 and the NASA Technical Memorandum 104260 are hereby incorporated by reference.

One of the problems encountered using the Wheatstone bridge is that the output is generally nonlinear with respect to the resistance change. Within the Wheatstone bridge are found various electrical connections and lead wires that attach the resistance to be measured to the rest of the Wheatstone bridge circuit. The Wheatstone bridge circuit may also contain additional components, such as slip rings for connecting rotating machinery and fuses for electrical fault protection. These various parasitic (i.e., present but undesirable) resistances will themselves vary due to the thermal, mechanical, chemical and other conditions of the environment. This variation in resistance may develop errors in measurement which are not always practical or easy to correct.

An example of a circuit known in the art which attempts to reduce the effects of parasitic resistance is a circuit which connects three wires to a remote variable resistor disposed in the environment. This three-wire circuit attempts to electrically subtract the parasitic resistance variations in each of the current carrying leads connected to the variable resistor. The parasitic resistances are effectively canceled at the output of the Wheatstone bridge by connecting the leads of adjacent arms of the Wheatstone bridge. This approach is effective in moderate temperature environments. The measurement system becomes less sensitive due to the increase in circuit resistance caused by the lead wires. In addition, since the wires and associated components are not identical, in severe temperature environments, the parasitic resistances vary greatly. This results in an unreliable output and inaccurate measurement. Thus, the prior art has been unable to measure resistance changes and temperatures which are unaffected by parasitic resistances or voltages.

It is, therefore, desirable to reliably measure resistance changes and temperature unaffected by external conditions such as parasitic lead wire resistances and thermoelectric effects which cause measurement errors. In addition, it is also desirable to minimize the number of conductors required for measuring resistance changes and temperature. Further, it is desirable to measure temperature in the presence of parasitic resistances resulting from environmental or external conditions.

SUMMARY OF THE INVENTION

It is an object of the present invention to provide a system for accurately measuring resistance changes and temperature unaffected by parasitic resistances encountered in the system resulting from environmental or external conditions.

It is another object of the present invention to provide a system which minimizes the amount of conductors required for measuring temperature and resistance changes.

It is further an object of the present invention to provide a system which measures temperature due to environmental or external conditions using parasitic voltages caused by temperature gradients along parasitic resistances in the system.

To achieve these and other objects, the present invention provides a constant current loop measuring system for measuring a property including the temperature of a sensor responsive to an external condition being measured. The measuring system includes thermocouple conductors connected to the sensor, sensing first and second induced voltages responsive to the external condition. In addition, the measuring system includes current generating and reversing means for generating a constant current, and for supplying the constant current to the thermocouple conductors in forward and reverse directions generating first and second measured voltages, and determining means for receiving the first and second measured voltages from the current generating and reversing means, and for determining the temperature of the sensor responsive to the first and second measured voltages.

These together with other objects and advantages which will be subsequently apparent, reside in the details of construction and operation as more fully hereinafter described and claimed, with reference being had to the accompanying drawings forming a part hereof, wherein like numerals refer to like elements throughout.

BRIEF DESCRIPTION THE DRAWINGS

FIG. 2b is a schematic diagram of a low noise version of the circuit depicted in FIG. 2a.

DETAILED DESCRIPTION OF THE PREFERRED EMBODIMENTS

Figure 1:
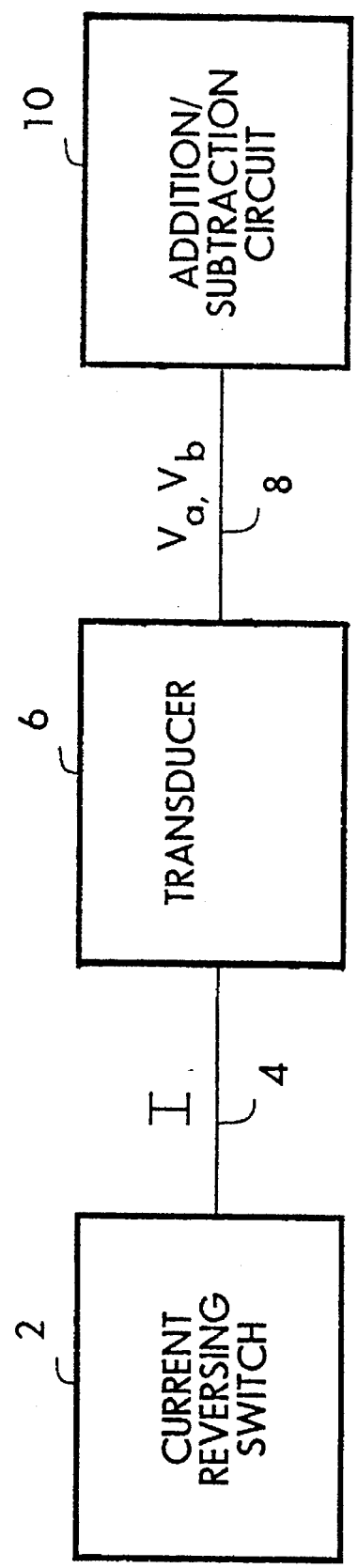
FIG. 1 is a block diagram of the basic construction of the resistance and thermoelectric measuring system of the present invention.

FIG. 1 is a block diagram of the basic construction of the present invention. In FIG. 1, transducer 6 receives current I from current reversing switch 2 in the forward and reverse direction via thermocouple conductors 4. Transducer 6 outputs first and second measured voltages $V_a$ and $V_b$ responsive to current I in the forward and reverse directions, respectively. Finally, addition/subtraction circuit 10 receives the first and second measured voltages $V_a$ and $V_b$ via conductors 8 and adds the first and second voltages to derive the resistance change and subtracts the first and second voltages to derive the thermoelectric effects which can be used to determine the temperature of transducer 6.

Figure 2A:
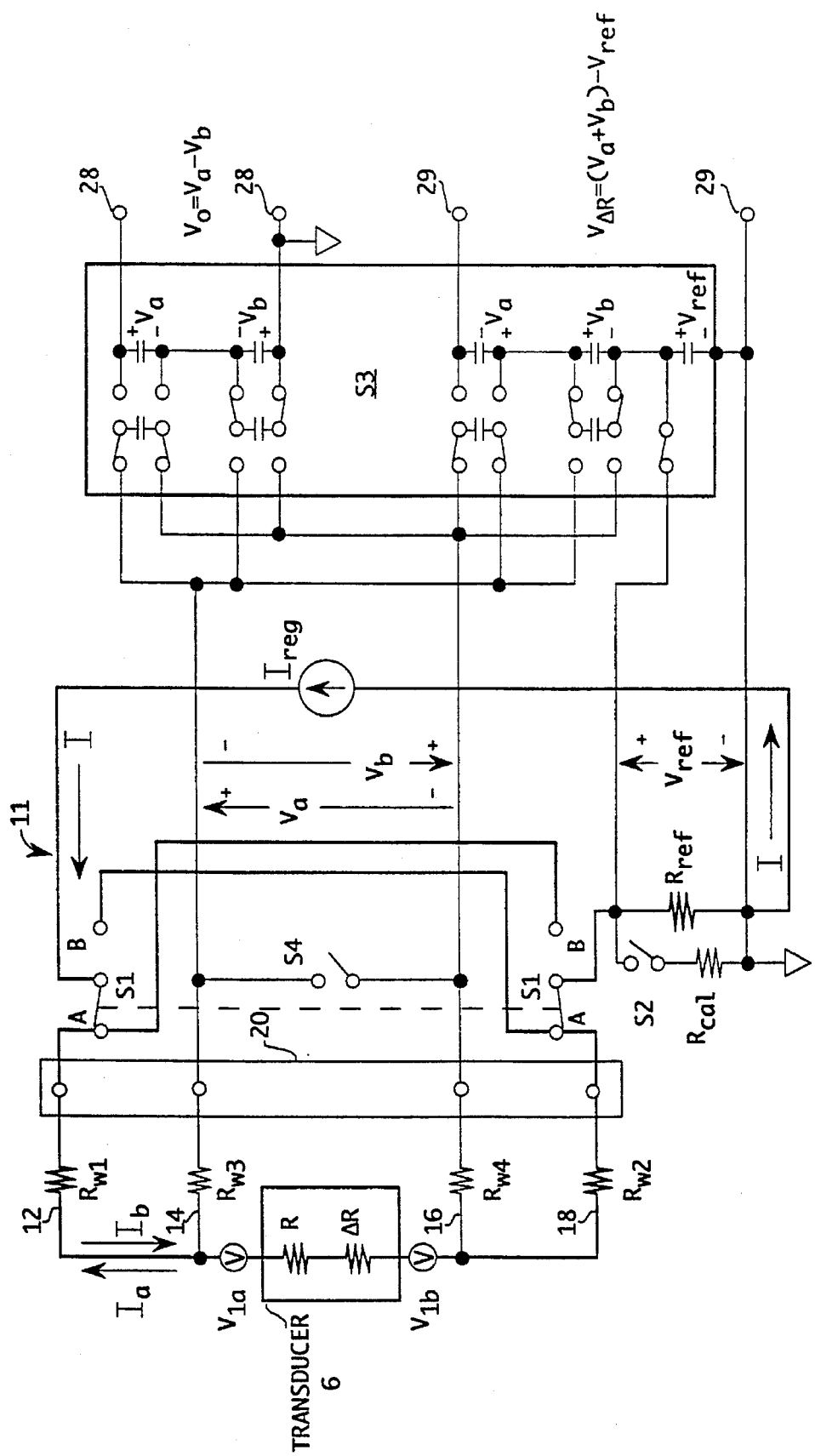
FIG. 2a is a schematic diagram of the resistance and thermoelectric measuring system of the present invention.

FIG. 2a is a schematic diagram of the resistance and temperature measuring system of the first embodiment of the present invention. In FIG. 2a, single series circuit loop 11 includes constant current regulator $I_{reg}$ which maintains current I at an essentially constant level within a predetermined range regardless of variations in the other components in the current loop. Parasitic resistances ($R_{w1}$, $R_{w2}$, $R_{w3}$ and $R_{w4}$) are present throughout the measuring system as illustrated and represent, for example, resistances in the lead wires of the measuring system, connection between the components of the measuring system or fault protection circuit elements included in the measuring system. For simplicity, these resistances will be referred to as "parasitic" resistances. Parasitic resistance $R_{w1}$ and $R_{w2}$ are positioned in the measuring system to carry the regulated excitation current I generated by the constant current regulator $I_{reg}$ in circuit loop 11. A reference resistance $R_{ref}$ is in series with the current regulator $I_{reg}$.

The present invention utilizes a variable-resistance type transducer 6, such as a strain gauge, having a total resistance $R_g$. The resistance $R_g$ comprises a fundamental resistance R in series with a variable resistance $\Delta R$ which represents the change in the transducer resistance resulting from the parameter measured by the transducer (stress, strain, etc.). Dissimilar metals (e.g., chromel, alumel, etc.) are used in output sensing wires 14 and 16 and they function as a thermocouple. Wires 12 and 18, which carry excitation current, are also implemented with dissimilar metals which are typically (but not necessarily) of the same material as wires 14 and 16, respectively. The voltage or electromagnetic force (emf) generated from the connection of sensing wire 14 to transducer 6 is represented by $V_{1a}$, whereas the voltage generated from the connection of sensing wire 16 to transducer 6 is represented by $V_{1b}$. The polarities of these voltages are dependent on the juxtaposition of the dissimilar metals. In order to generate voltages $V_{1a}$ and $V_{1b}$, there must be a temperature gradient along sensing wires 14 and 16. By the law of intermediate metals, the connections to transducer 6 do not change the net thermoelectric voltage as long as the connections remain at the same temperature. This same law permits thermally contacting thermocouple conductors to a third material without introducing error voltages as long as the third material has the same temperature at both contact points. Herein, the ends of wires 12, 14, 16 and 18 remote from transducer 6 are kept at the same temperature by isothermal reference area 20. In FIG. 2a, the four wires extending to the right of area 20 (and proceeding to switches S1 and S4) are typically copper. The temperature of isothermal reference area 20 is measured by a conventional temperature transducer (not shown) to enable the calibration of the thermocouple wires.

An indication of the sensitivity of the resistance measurement system of the present invention may be obtained by introducing a known change in calibration resistance $\Delta R_{cal}$. To introduce the known change in calibration resistance, a calibration resistor $R_{cal}$ is connected via single polesingle throw (SPST) switch S2 in parallel with reference resistor $R_{ref}$. Both calibration resistor $R_{cal}$ and reference resistor $R_{ref}$ are fixed resistors in a controllable environment. The known change in calibration resistance $\Delta R_{cal}$ can be represented by the following equation:

$$\Delta R_{cal} = R_{ref} - [(R_{ref})(R_{cal})/(R_{ref} + R_{cal})] \tag{1}$$

This calibration method introduces a known change in resistance similar to the unknown change in resistance $\Delta R$ of transducer resistance $R_g$. That is, during this calibration method, $\Delta R$ equals half of $\Delta R_{cal}$. Since current I is regulated to be constant by current regulator $I_{reg}$, the calibration output magnitude is not a function of transducer resistance $R_g$ or any parasitic resistances such as resistances $R_{w1}$ or $R_{w2}$ in circuit loop 11. Thus, the overall sensitivity of the measurement system to resistance change is calibrated as a function of the change of transducer resistance $\Delta R$ which equals $\Delta R_{cal}/2$.

In order to achieve the required measurements, constant current I generated by current regulator $I_{reg}$ which flows through transducer resistance $R_g$ is periodically reversed as currents $I_a$ and $I_b$ by switch S1. Switch S1 is switched from position a to position b after a sufficient time period to obtain measured voltage $V_a$, and switched from position b to position a to obtain measured voltage $V_b$. Switch S1 may be, for example, a conventional double pole, double throw switch implemented by field effect transistor switches. Accordingly, two separate outputs are obtained responsive to the position of switch S1; measured voltage $V_a$ when switch S1 is in position a, and measured voltage $V_b$ when switch S1 is in position b. Measured voltages $V_a$ and $V_b$ are sensed in a conventional high-impedance manner so that essentially no current is permitted to flow through thermocouple wires 14 and 16 and respective resistances $R_{w3}$ and $R_{w4}$. Thus, there is essentially no voltage drop caused by current flowing through thermocouple wires 14 and 16 to be considered. Accordingly, when insignificant current is drawn while measuring voltages $V_a$ and $V_b$, the circuit equations are as follows:

$$V_a = +[(V_{1a}) + (V_{1b})] + I(R + \Delta R) \tag{2}$$

$$V_b = -[(V_{1a}) + (V_{1b})] + I(R + \Delta R) \tag{3}$$

In order to eliminate voltages $V_{1a}$ and $V_{1b}$ to determine the change in resistance $\Delta R$, equations (2) and (3) are added together and summed with $-V_{ref}$ resulting in the following equation when $R_{ref} = 2R$:

$$V_a + V_b - V_{ref} = 2I(\Delta R) \tag{4}$$

which shows the resistance change $\Delta R$ as a function of measured voltages $V_a$, $V_b$ and $V_{ref}$. In addition, transducer resistance change $\Delta R$ is not a function of, or effected by, thermocouple wire resistances $R_{w1}$–$R_{w4}$ or induced voltage sources $V_{1a}$ and $V_{1b}$. Therefore, the indicated transducer resistance change $\Delta R$ will not be influenced by thermoelectric or other induced voltage effects. Also, since current I is regulated to be constant by current regulator $I_{reg}$, measured voltages $V_a$ and $V_b$ and reference voltage $V_{ref}$ are not influenced by any other resistances which may exist and cause undesirable voltage drops in the current loop. Further, any zero offset may be made arbitrarily small by choosing or adjusting reference resistor $R_{ref}$ to a resistance value that approaches approximately twice the initial resistance value R of transducer resistance Rg.

In addition to the resistance change which may be derived and measured from the measuring system of the present invention, the thermoelectric voltage is also measured using thermocouple wires 14, and 16 which are, as indicated above, comprised of dissimilar alloys to generate a thermoelectric voltage when exposed to a temperature gradient. Thus, in order to determine the thermoelectric voltage, equations (1) and (2) are subtracted yielding the following equation:

$$V_a - V_b = 2(V_{1a} + V_{1b}) \quad (5)$$

Equation (5) derives the thermoelectric voltage from measured voltages $V_a$ and $V_b$. Since the elements of the transducer model such as transducer resistance $R_g$, lead wire resistances $R_{w1}$–$R_{w4}$ do not appear in equation (5), the difference between the measured voltages $V_a$ and $V_b$ is not influenced by changes in the transducer or lead wire resistances. Note that equation (5) yields an output voltage which is twice the thermocouple output voltage between thermocouple wires 14 and 16. The transducer temperature is then determined from a thermocouple reference table utilizing the following known information: one half of the measured output voltage ($V_a - V_b$), the measured temperature of isothermal reference over 20 and the specific alloys used in the thermocouple wires. One such thermocouple reference table is the International Practical Temperature Scale (IPTS)-68 developed by the National Bureau of Standards (NBS). This table is reproduced in the Temperature Handbook of the Complete Measurement and Control Handbooks of Encyclopedia generated by OMEGA Engineering, Inc. of Stamford, Conn.

In FIG. 2a, multiplexer S3 is employed to perform the arithmetic functions of equations (4) and (5). It produces output voltages $V_o$ and $V_{\Delta R}$ equal to $(V_{1a}+V_{1b})$ and $\Delta R$, respectively, at terminals 28 and 29, respectively. Multiplexer S3 is a schematic depiction of a dual-signal flying capacitor multiplexer comprising many capacitors and switches. Voltage $V_o$ is produced by two series-connected capacitors which are charged to $V_a$ and $V_b$, respectively. The capacitors are connected in a polarity arrangement such that the voltage at terminals 28 is $(V_a - V_b)$ which varies directly as $(V_{1a}+V_{1b})$. Voltage $V_{\Delta R}$ is produced by three series-connected capacitors which are charged to $V_a$, $V_b$, and $V_{ref}$, respectively. The capacitors are interconnected in such a manner that the output voltage at terminals 29 is $(V_a+V_b-V_{ref})$ which varies directly as $\Delta R$. Thus, $V_o$ is a direct function of $(V_{1a}+V_{1b})$ and $V_{\Delta R}$ is a direct function of $\Delta R$.

Figure 2B:
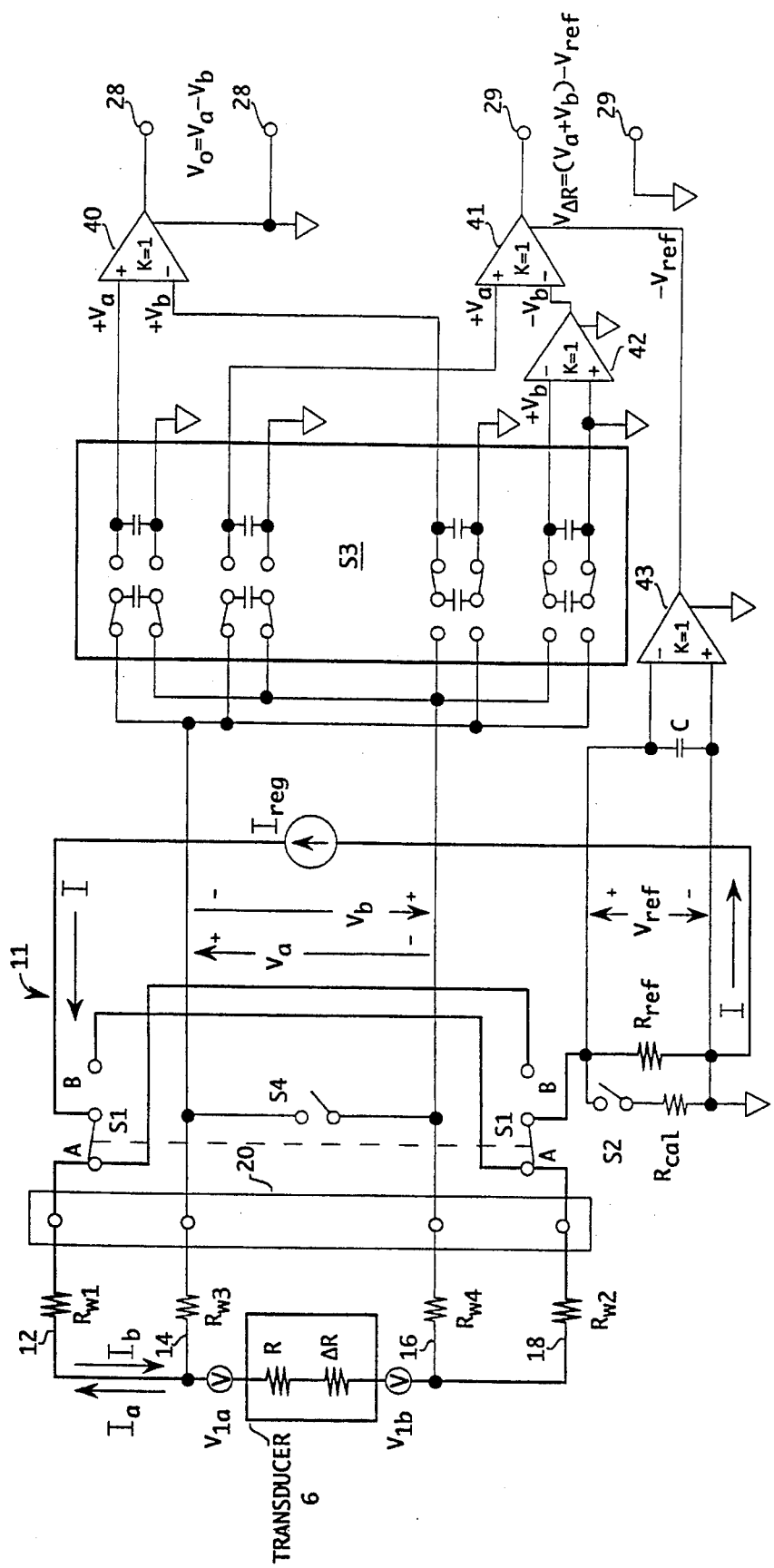

FIG. 2b depicts an alternate circuit for deriving voltages $V_o$ and $V_{\Delta R}$ with one transducer. In the circuit of FIG. 2b, multiplexer S3 is utilized to perform only the sampling and holding of voltages $V_a$ and $V_b$. The configuration of FIG. 2b transfers voltages from a floating input to a grounded output and achieves a lower noise floor at the cost of a few additional components. Integrated circuit instrumentation amplifiers 40, 41, 42 and 43 are employed to perform the arithematic functions of equations (4) and (5). The instrumentation amplifiers provide very high impedance at the input terminals, amplify with a selected gain, and deliver an output voltage referenced to the electrical potential of the reference terminal.

Amplifier 40 produces $V_o$ by the subtraction of $+V_b$ at its inverting input from $+V_a$ at its non-inverting input. The reference terminal of amplifier 40 is connected to analog common. This arrangement produces $(V_a-V_b)$ at terminals 28 which varies directly as $(V_{1a}-V_{1b})$. Voltage $V_{\Delta R}$ is produced by amplifier 41. Amplifier 42 inverts $+V_b$ to produce $-V_b$. Capacitor C absorbs switching transients on $V_{ref}$. Amplifier 43 inverts to produce $-V_{ref}$. Amplifier 41 has $+V_a$ connected to the non-inverting input, $-V_b$ connected to the inverting input and $-V_{ref}$ connected to the reference input. This arrangement produces $(V_a+V_b-V_{ref})$ at terminals 29 which varies directly as $\Delta R$. Thus $V_o$ is a direct function of $(V_{1a}+V_{1b})$ and $V_{\Delta R}$ is a direct function of $\Delta R$.

The flying capacitor multiplexer may, for example, utilize integrated circuit analog multiplexer switches using field effect transistors. These analog multiplexer switches are commercially available with drive circuitry all integrated into the same package, and can also accommodate voltage levels as high as 10 volts. Preferably, the switch leakage current should be under 10 nanoamperes (nA), the "on" resistance less than 1,000Ω, and the common mode rejection ratio greater than 100dB. The capacitors in the S3 multiplexer should nominally be 0.1 microfarad (μF) with low dielectric leakage (such as metalized polypropylene film capacitors). The magnitude of the capacitance does not need to be either precise or stable since the only function of the capacitors is to transfer and store electrical charge with minimal loss. As the capacitors remain charged to nearly constant levels in operation, no significant current surges occur in the circuit and the signal-to-noise ratio is high.

Additionally, switching in dual-signal multiplexer S3 is synchronized so that none of the capacitors are connected to transducer resistance $R_g$ or reference resistance $R_{ref}$ during the time when electrical transients are generated when switch S1 reverses constant current I. This ensures that the capacitors are connected to steadystate voltages, thereby minimizing the errors caused by charge transfer between capacitors and assuring that a minimum of current flows through thermocouple wires 14 and 16 and resistances $R_{w3}$ and $R_{w4}$. Thus, multiplexer S3 is able to add and subtract voltage drops typically from one to two volts across resistances ranging from 60 to 1,000 ohms with errors typically no greater than 0.5μV using the above approach.

SPDT switch S4 makes it easy to determine the effects of unwanted noise (common mode voltages). Examples of paths for unwanted noise energy to enter transducer 6 and/or the circuit coupled thereto are electrostatic coupling, electromagnetic coupling and thermal gradients across material discontinuities causing additional thermally induced electrical potentials. Mechanical energy can also develop unwanted electrical effects by various means including changing the dimensions and thereby the inductance of a conductor carrying constant current and by changing the spacing between conductors acting as a capacitor holding a constant charge.

A direct indication of any effect on the measurement system caused by common mode voltages is obtained by activating switch S4. The closure results in the sensing of the voltage at one end of transducer 6 and avoids sensing potentials $V_{1a}$ and $V_{1b}$ and the voltage drop across transducer 6. Any resulting non-zero indication at terminals 28 or 29 is thus caused by either common mode rejection problems or a malfunctioning meter used to measure voltage at the output terminals 28 and 29.

Figure 3:
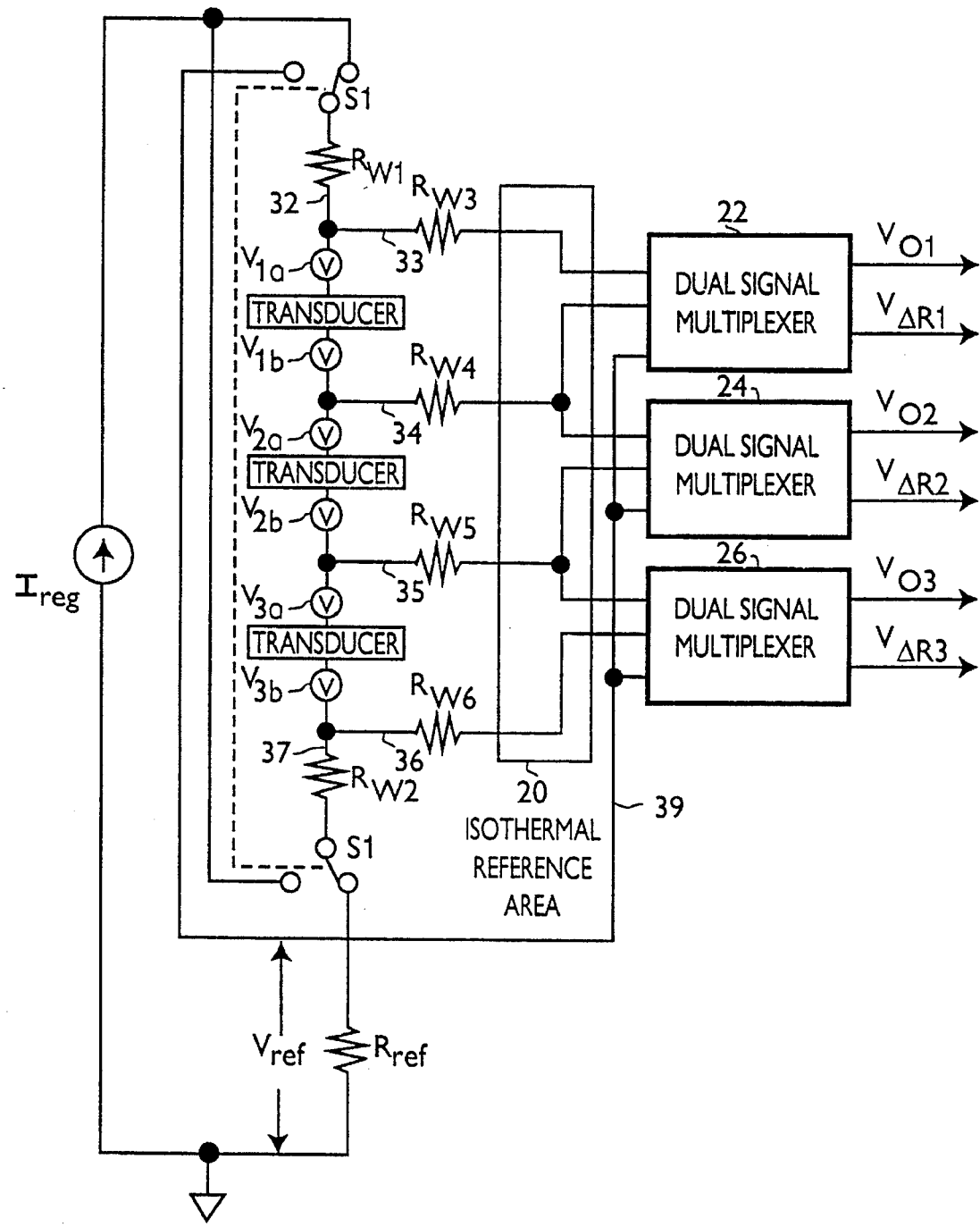
FIG. 3 is a schematic diagram of another embodiment of the resistance and thermoelectric measuring system of the present invention having multiple transducers.

FIG. 3 is a schematic diagram of another embodiment of the present invention. In this embodiment three transducers are featured rather than one. Only six thermocouple wires 32, 33, 34, 35, 36 and 37 are needed for this system. Resistances $R_{w1-w6}$ represent the parasitic resistances in the thermocouple wires. Thermocouple wires 33, 34, 35 and 36 couple the thermoelectric potentials to dual-signal multiplexers 22, 24 and 26, and line 39 couples voltage $V_{ref}$ to the three multiplexers. Output voltages $V_{01-03}$ are a function of the respective transducer temperatures and output voltages $V_{\Delta R1}-V_{\Delta R3}$ are representative of the resistance changes in the respective transducers.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A constant current loop measuring system measuring a property including a temperature of a sensor responsive to an external condition being measured, comprising:

thermocouple conductors connected to the sensor, sensing first and second induced voltages responsive to the external condition;

current generating and reversing means for generating a constant current, and for supplying said constant current to said thermocouple conductors in forward and reverse directions generating first and second measured voltages, each of said first and second measured voltages including said first and second induced voltages; and determining means for receiving said first and second measured voltages from said current generating and reversing means, and for determining the temperature of the sensor responsive to said first and second measured voltages.

2. A constant current loop measuring system according to claim 1, wherein said determining means determines another property of the sensor responsive to said first and second measured voltages.

3. A constant current loop measuring system according to claim 2, wherein the another property of the sensor is a resistance change of the sensor responsive to the external condition being measured.

4. A constant current loop measuring system according to claim 1, wherein the sensor comprises a strain gauge.

5. A constant current loop measuring system according to claim 1, wherein the sensor includes a resistance having a constant resistance and a variable resistance varying in response to the external condition, and said thermocouple conductors include parasitic resistance, and wherein the constant current loop measuring system further comprises calibration means for calibrating the constant current loop measuring system responsive to said variable resistance and independent of said parasitic and constant resistances.

6. A constant current loop measuring system according to claim 1, wherein said thermocouple conductors include parasitic resistance and the resistance of the sensor includes a constant resistance, and wherein said constant current loop measuring system measures the temperature of the sensor independent of said parasitic and constant resistances.

7. A constant current loop measuring system according to claim 1, wherein said constant current loop measuring system measures the temperature of the sensor responsive to:

$$V_a-V_b=2(V_{1a}+V_{1b}),$$

where $V_{1a}$ and $V_{1b}$ are said first and second induced voltages and $V_a$ and $V_b$ are said first and second measured voltages.

8. A constant current loop measuring system according to claim 3, wherein said constant current loop measuring system measures said resistance change of the sensor according to:

$$V_a+V_b-V_{ref}=2I(\Delta R),$$

where $V_{ref}$ is a reference voltage of the constant current loop measuring system, I is said constant current, $\Delta R$ is said resistance change and $V_a$ and $V_b$ are said first and second measured voltages.

9. A constant current loop measuring system according to claim 1, wherein said determining means includes addition means for adding said first and second measured voltages and subtraction means for subtracting said reference voltage to determine the resistance change of the sensor.

10. A constant current loop measuring system according to claim 1, wherein said determining means includes subtraction means for subtracting said first and second measured voltages to determine the temperature of the sensor.

11. A constant current loop measuring system, comprising:

a sensor experiencing a temperature and a resistance change responsive to an external condition being measured;

thermocouple conductors connected to said sensor, sensing first and second induced voltages responsive to the external condition;

current generating and reversing means for generating a constant current, and for supplying said constant current to said thermocouple conductors in forward and reverse directions generating first and second measured voltages, each of said first and second measured voltages including said first and second induced voltages; and determining means for receiving said first and second measured voltages from said current generating and reversing means, and for determining said temperature and said resistance change of said sensor responsive to said first and second measured voltages.

12. A constant current loop measuring system according to claim 11, wherein said sensor comprises a strain gauge.

13. A constant current loop measuring system according to claim 11, wherein said sensor includes a resistance having a constant resistance and a variable resistance varying in response to said external condition, and said thermocouple conductors include parasitic resistance, and wherein the constant current loop measuring system further comprises calibration means for calibrating the constant current loop measuring system responsive to said variable resistance and independent of said parasitic and constant resistances.

14. A constant current loop measuring system according to claim 11,
wherein said thermocouple conductors include parasitic resistance and said sensor includes a constant resistance, and
wherein said constant current loop measuring system measures said temperature and said resistance charge of said sensor independent of said parasitic and constant resistances.

15. A constant current loop measuring system according to claim 11, wherein said constant current loop measuring system measures said temperature of said sensor responsive to:

$$V_a - V_b = 2(V_{1a} + V_{1b}),$$

where $V_{1a}$ and $V_{1b}$ are said first and second induced voltages and $V_a$ and $V_b$ are said first and second measured voltages.

16. A constant current loop measuring system according to claim 11, wherein said constant current loop measuring system measures said resistance change of said sensor according to:

$$V_a + V_b - V_{ref} = 2 I(\Delta R),$$

where $V_{ref}$ is a reference voltage of the constant current loop measuring system, I is said constant current, $\Delta R$ is said resistance change and $V_a$ and $V_b$ are said first and second measured voltages.

17. A constant current loop measuring system according to claim 11, wherein said determining means includes addition/subtraction means for subtracting said first and second measured voltages to determine said temperature of said sensor and for adding said first and second measured voltages and subtracting a reference voltage to determine said resistance change of said sensor.

18. A method for measuring a property including a temperature of a sensor responsive to an external condition being measured using a constant current loop measuring system, comprising the steps of:
(a) sensing first and second induced voltages responsive to the external condition using thermocouple conductors;
(b) generating and supplying a constant current to the thermocouple conductors in forward and reverse directions generating first and second measured voltages, each of the first and second measured voltages including the first and second induced voltages sensed in said sensing step (a); and
(c) determining the temperature of the sensor responsive to the first and second measured voltages generated in said generating step (b).

19. A method according to claim 18, wherein said determining step (c) further includes the step of determining another property of the sensor responsive to the first and second measured voltages.

20. A method according to claim 18, wherein said determining step (c) further includes the step of determining a resistance change of the sensor responsive to the external condition being measured using the first and second measured voltages and a reference voltage developed from said constant current.

21. A method according to claim 18, further comprising the step of calibrating the constant current loop measuring system responsive to a variable resistance of the sensor and independent of a parasitic resistance of the thermocouple conductors and a constant resistance of the sensor.

22. A method according to claim 18, wherein said determining step (c) determines the temperature of the sensor independent of a parasitic resistance of the thermocouple conductors and a constant resistance of the sensor.

23. A method according to claim 18, wherein said determining step (c) determines the temperature of the sensor responsive to:

$$V_a - V_b = 2(V_{1a} + V_{1b}),$$

where $V_{1a}$ and $V_{1b}$ are the first and second induced voltages and $V_a$ and $V_b$ are the first and second measured voltages.

24. A method according to claim 20, wherein said determining step (c) determines the resistance change of the sensor according to:

$$V_a + V_b - V_{ref} = 2I(\Delta R),$$

where $V_{ref}$ is a reference voltage of the constant current loop measuring system, I is the constant current, $\Delta R$ is the resistance change and $V_a$ and $V_b$ are the first and second measured voltages.

25. A method according to claim 18, wherein said determining step (c) further comprises the step of adding the first and second measured voltages to determine the temperature of the sensor.

26. A method for measuring a property including a temperature and a resistance change of a sensor responsive to an external condition being measured using a constant current loop measuring system, comprising the steps of:
(a) introducing the external condition to the sensor;
(b) sensing first and second induced voltages responsive to the external condition using thermocouple conductors;
(c) generating and supplying a constant current to the thermocouple conductors in forward and reverse directions generating first and second measured voltages, each of the first and second measured voltages including the first and second induced voltages sensed in said sensing step (b); and
(d) determining the temperature and the resistance change of the sensor responsive to the first and second measured voltages generated in said generating step (c).

27. A method according to claim 26, further comprising the step of calibrating the constant current loop measuring system responsive to a variable resistance of the sensor and independent of a parasitic resistance of the thermocouple conductors and a constant resistance of the sensor.

28. A method according to claim 26, wherein said determining step (c) determines the temperature and the resistance change of the sensor independent of a parasitic resistance of the thermocouple conductors and a constant resistance of the sensor.

29. A method according to claim 26,
wherein said determining step (d) determines the temperature of the sensor responsive to:

$$V_a - V_b = 2(V_{1a} + V_{1b}), \text{ and}$$

wherein said determining step (d) determines the resistance change of the sensor according to:

$$V_a + V_b - V_{ref} = 2\,I(\Delta R),$$

where I is the constant current of the constant current measuring system, $V_{ref}$ is a reference voltage developed by the constant current, $\Delta R$ is the resistance change, $V_{1a}$ and $V_{1b}$ are the first and second induced voltages and $V_a$ and $V_b$ are the first and second measured voltages.

30. A method according to claim 26, wherein said determining step (d) further comprises the step of subtracting the first and second measured voltages to determine the temperature of the sensor and adding the first and second measured voltages and subtracting a reference voltage to determine the resistance change of the sensor.

* * * * *